April 18, 1967   A. A. BIEN   3,314,465
NUT WITH RESILIENT ARMS
Filed July 22, 1963
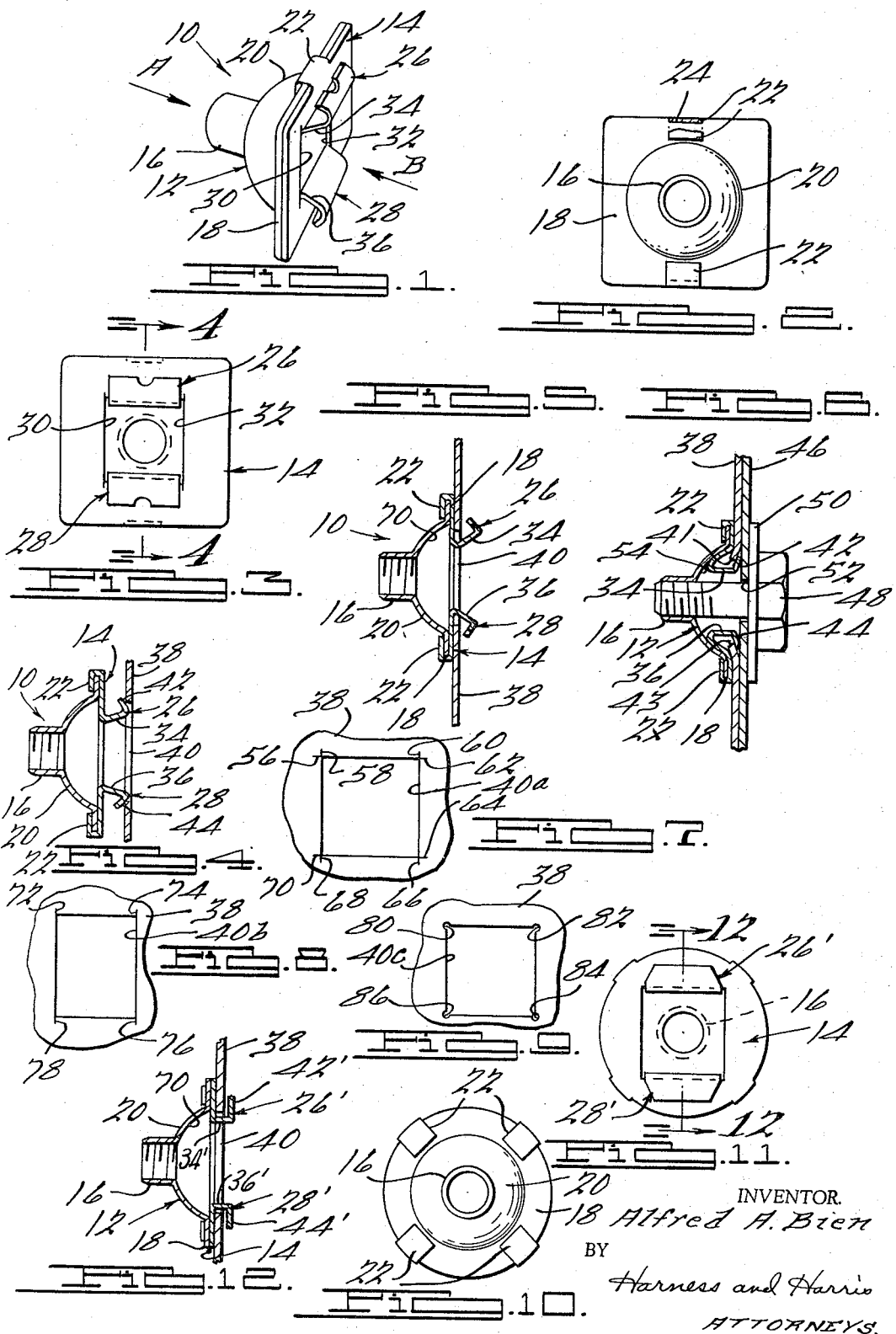
INVENTOR.
Alfred A. Bien
BY
Harness and Harris
ATTORNEYS.

United States Patent Office 3,314,465
Patented Apr. 18, 1967

3,314,465
NUT WITH RESILIENT ARMS
Alfred A. Bien, Dearborn, Mich., assignor to Chrysler Corporation, Highland Park, Mich., a corporation of Delaware
Filed July 22, 1963, Ser. No. 296,716
6 Claims. (Cl. 151—41.75)

This invention relates generally to fastener means and more particularly to that class of fastener devices adapted to be mounted on a relatively thin panel, as by means of projecting hook portions, for receiving a cooperating screw therethrough.

Various forms of caged-nut-type fasteners have heretofore been proposed, none of which have been found to be entirely satisfactory. For example, in the usual form of a caged nut fastener, a nut body is loosely contained generally within a fabricated metal cage. The cage is also provided with panel engaging hook portions which extend through a suitable aperture provided in the panel and engage the rear surface of the panel so as to retain the cage and nut, at least loosely, against the front surface of that same panel.

An example of such a caged nut fastener, as generally referred to above, is illustrated by United States Patent 3,035,624 issued to L. S. Jaworski.

Fasteners constructed in accordance with the prior art, as for example taught by said Jaworski patent, contain at least one major failing. As illustrated by FIGURES 5 and 6 of Patent 3,035,624, tightening the screw moves the caged nut downwardly causing the hook members to be flattened between the nut body and mounting panel and between the mounting panel and the second panel being secured thereto by said screw. Consequently failure of such trapped portions of the cage and hooks usually occurs as the screw is brought to its fully tightened condition.

Accordingly an object of this invention is to provide in a fastener device, hook portions which are effective for retaining the fastener body to the mounting panel and yet capable of partially withdrawing into the retainer body whenever the cooperating screw is brought into tightened engagement thereagainst.

Another object of this invention is to provide a retainer having a configuration whereby a cavity or chamber is provided for at least the partial reception therein of portions of the fastener hooks during such periods as when the cooperating screw is tightened thereagainst.

In furtherance of the above objects the invention contemplates the provision of a device to adapt a relatively thin structure for the reception of a screw having a nut body adapted to be urged against one surface of said thin structure and a pair of relatively resilient hooks for engaging another surface of said structure oppositely disposed to said one surface, a cavity formed by said nut body for at least the partial reception therein of at least one of said hooks whenever said screw is engaged with said nut body and tightened thereagainst so as to urge said hooks toward said nut body.

Other more specific objects and advantages of the invention will become apparent when reference is made to the following description and accompanying drawings wherein:

FIGURE 1 is a perspective view of a fastener constructed in accordance with the teachings of this invention;

FIGURES 2 and 3 are views taken generally in the direction of arrows A and B, respectively, of FIGURE 1;

FIGURE 4 is a cross-sectional view taken generally on the plane of line 4—4 of FIGURE 3 illustrating the retainer in the process of being attached to a suitable supporting panel;

FIGURE 5 is a view similar to FIGURE 4 illustrating the retainer as being attached to the supporting panel;

FIGURE 6 is a cross-sectional view similar to FIGURE 5 but also illustrating the attachment thereto of a second panel as by means of a suitable screw;

FIGURES 7, 8 and 9 are similar views taken on the plane of line 7—7 of FIGURE 4 illustrating modifications of the retainer-receiving aperture formed in the mounting panel; and FIGURES 10, 11 and 12, similar to FIGURES 2, 3 and 5, respectively, illustrate another embodiment of the invention.

Referring now in greater detail to the drawings, a fastener device 10, constructed in accordance with the teachings of this invention is illustrated as being comprised of a metal nut body 12 secured to a metal base member 14. Body 12 is provided with a generally tubular internally threaded portion 16 and a flange portion 18 formed so as to be in a plane generally perpendicular to the axis of said tubular threaded portion. A bell-like arcuate connecting portion 20 joins the flange 18 to the tubular portion 16.

Base member 14, which may have a periphery closely following the outer periphery of flange 18, is secured to flange 18 by means of tabs or extensions 22 formed thereon which are curled over the flange 18. Cut out portions or notches 24 may be formed in the periphery of flange 18 in order to partially receive the curled over tabs 22.

Base 14 has a generally H-pattern slit formed therethrough providing oppositely disposed flaps which are subsequently curled outwardly from the base and away from each other so as to form retaining hooks 26 and 28. As illustrated by FIGURES 1 and 3, the parallel slits 30 and 32 have their respective ends extending a substantial distance beyond where leg portions 34 and 36 of hooks 26, 28, respectively, are bent away from the plane of the base.

FIGURE 4 illustrates, in cross-section, the preferred arrangement of hooks 26 and 28. That is, the curled-back portions 42 and 44 are so formed as to present inclined surfaces against the edges defining the generally square or rectangular aperture 40 of mounting panel 38. This enables the fastener 10 to be pressed towards panel 38 causing the hooks 26 and 28 to be deflected towards each other, by the wedging action of curled-back portions 42 and 44, in order to permit insertion of the hooks through aperture 40.

FIGURE 5 illustrates the position of the fastener 10 with respect to the mounting panel 38 after the hooks 26 and 28 have been sufficiently deflected to permit their insertion through the aperture 40.

FIGURE 6 illustrates a second panel 46 in secured relationship to the mounting panel 38. A suitable screw 48, having a collar or washer 50 and received through an aperture 52 formed in panel 46, threadably engages the internally threaded tubular portion 16. As screw 48 is tightened, hooks 26 and 28 are forced inwardly by panel 46 so as to be generally received within cavity 54 defined by connecting portion 20 of nut body 12. As screw 48 is fully tightened, sides 41 and 43 of aperture 40 are also deflected inwardly towards cavity 54 in order to accommodate the thickness of hook portions 42 and 44 between panels 38 and 46.

Accordingly, it can be seen that no amount of excessive force applied by the tightening action of screw 48 will cause failure of hooks 26 and 28 because of the resiliency of sides 41 and 43 of aperture 40 and the space provided by cavity 54 for receiving portions of hooks 26 and 28 as they are forced inwardly thereof by panel 46.

A modified form of aperture 40a is illustrated in FIGURE 7 as being substantially square and having slit portions 56, 58, 60, 62, 64, 66, 68 and 70 extending a substantial distance beyond the sides of aperture 40a. The provision of such slit portions enhances the flexibility and resiliency of the sides of aperture 40a so as to enable the sides of the aperture to more readily deform into cavity 54 as illustrated at 41 and 43 of FIGURE 6. The provision of such slit portions in panels having relatively thick cross-sections can be of material significance.

FIGURE 8 illustrates an aperture 40b of further modified form. Aperture 40b is of generally rectangular configuration having a length substantially equivalent to the length of aperture 40 but narrower in width so as to be only slightly greater than the width of hooks 26 and 28. In the modified form of aperture 40b only two pairs of parallel slits 72, 74, 76 and 78 are provided.

FIGURE 9 illustrates a third modified form of mounting aperture 40c as being generally square and having arcuate like relief portions 80, 82, 84 and 86 formed in the respective corners of the square. The provision of such reliefs minimizes stress concentrations which might occur at the corners and provides some degree of increased flexibility to the sides of aperture 40c in much the same manner as the slits of FIGURES 7 and 8.

The square form of retainer mounting-aperture is preferred because of the ability afforded thereby of inserting the fastener 10 in any direction therethrough. The modified rectangular form of aperture 40b is equally effective as the square form of apertures 40, 40a and 40c except that reception of the fastener hooks therethrough is restricted to a single direction.

Another important feature of fastener 10 is the fact that flange 18 and base 14 provide a continuous thrust face acting against the mounting panel 38. This is in contrast to the various forms of caged nut arrangements of the prior art wherein the cage is trapped between the nut and the mounting panel resulting in only two discontinuous bearing surfaces. Further, such bearing surfaces of the prior art were also placed in conditions of shear stress by the edges of the caged nut resulting, in many instances, in the failure of the cage and the hooks formed thereon.

FIGURES 10, 11 and 12 illustrate another embodiment of the fastener 10. All elements thereof which are like or similar to the corresponding elements of FIGURES 1–6 are identified with like reference members. Aside from the periphery of flange 18 and base 14 being circular a further difference exists in the hooks 26' and 28'. That is, as seen in FIGURE 12, the hooks are formed so as to have leg portions 34' and 36' extending away from the base 14 at generally right angles thereto while the bent-back portions 42' and 44' are substantially parallel to the base 14.

All of the advantages disclosed with reference to the structure of FIGURE 1–9 apply equally well to the embodiment of FIGURES 10, 11 and 12.

In view of the above it should be apparent that the configuration of the nut body and flange need not be precisely that disclosed by the two embodiments described. For example, the nut body could assume shapes such as, cup-like, conical or generally spherical configurations to mention but a few. An important consideration in each of these configurations being the provision of a cavity 54 in order to accommodate the hooks whenever they are urged inwardly toward the nut body as by the action of the screw 48 and cooperating panel 46. Likewise it is not essential that the threaded portion of the nut body be formed to extend away from the major portion of the nut body. That is, the threaded portion would be just as effective if it were formed generally inwardly of the central portion of the nut body. This could be accomplished, for example, by the provision of an internally threaded tubular portion directed inwardly of the nut body so as to be confined generally within the cavity 54.

Although but two embodiments of the invention have been disclosed and described, it is apparent that other embodiments and modifications thereof are possible within the scope of the appended claims.

I claim:

1. A device to adapt a relatively thin structure for the reception of a screw, comprising a nut body carrying secured thereto a metal base member adapted to be urged against one surface of said thin structure, said base member being secured to said nut body in a manner precluding any substantial relative movement therebetween, said base member including a pair of relatively resilient hooks for engaging another surface of said structure oppositely disposed to said one surface, said hooks including leg portions integrally formed with said base member and extending outwardly therefrom and being deflectable towards each other, and a cavity formed by said nut body for at least the partial reception therein of said leg portions and of said hooks whenever said screw is engaged with said nut body and tightened thereagainst so as to urge said leg portions and said hooks towards said nut body.

2. In a device to adapt a relatively thin metal structure for the reception of a screw having a nut body adapted to be urged against one surface of said thin metal structure and a pair of relatively resilient hooks deflectable towards each other for engaging another surface of said structure oppositely disposed to said one surface, a substantially continuous flange surface formed on said body for abutting against said thin metal structure, a cavity formed by said nut body for at least the partial reception therein of said hooks whenever said screw is engaged with said nut body and tightened thereagainst so as to urge said hooks gnerally towards each other and towards said cavity of said nut body.

3. A fastener comprising a metal body, said body comprising an internally threaded portion and a flange, a connecting portion joining said flange to said threaded portion, a metal base member secured to said flange in abutting engagement therewith, at least one resilient hook formed from said base member so as to project a substantial distance away from the plane of said base and adapted to be received through an aperture of a cooperating mounting panel, and a cavity formed within said body and defined generally by said connecting portion and said base for at least partly receiving therein said resilient hook whenever a second member is urged against said mounting panel and said hook as by means of a mounting screw coacting with said internally threaded portion.

4. In a device to adapt a relatively thin structure for the reception of a screw having a threaded nut body, with a cavity formed therein, adapted to be secured to said thin structure on one side thereof, fastening means carried by said nut body for securing said body to said thin structure, said fastening means comprising a generally flat relatively flexible member secured to said body so as to be retained generally between said body and said thin structure, hook portions formed integrally with said flat member and projecting therefrom so as to engage another side of said thin structure oppositely disposed to said one side, an opening provided through said flexible member generally between said hook portions for the reception therethrough of said screw, and slits formed in said flexible member extending from said opening and in close proximity to said hook portions for increasing the flexibility of said hook portions and enabling said hook portions to be at times at least partially received within said cavity.

5. Fastener means comprising a nut body, said nut body comprising an internally threaded tubular portion formed at the smaller end of a truncated generally conical body portion, a radiating flange formed about the larger end of said conical body portion, a relatively thin base member secured against said flange and forming a surface for abutting against a cooperating mounting panel, a cavity defined generally by said body portion and said base member, a pair of spaced hooks formed by bending central portions of said base member to extend generally away from said base member, and a slit formed in said base member on each side of said hooks for increasing the resiliency of each of said hooks with respect to said nut body.

6. A cage nut comprising a nut part having a flat sheet metal radially extending base flange and a centrally disposed outwardly extruded internally screw threaded tubular nut element formed with a downwardly and outwardly flaring skirt, the lower edge of which is integral with said flange, at least one notch in the edge portion of said flat base flange, a mounting part having a sheet metal plate, against which said base flange flatly abuts, tab means bent upwardly into said notch and then laterally inward into flatwise engagement with the outer face of said sheet metal base flange, thereby to hold the nut and mounting parts against relative turning movements, the bend of said tab means being substantially flush with the adjacent edge portions of said sheet metal plate, said sheet metal plate having laterally spaced slits and the portion between such slits being severed centrally and downward and outward and upward curved attaching hooks formed therefrom for engagement in a supporting panel aperture by first hooking one hook against an edge of the panel aperture and then forcing the other hook downwardly, the curved contour of the hook enabling a cam action to take place to effect snap engagement with the adjacent edge of such aperture, and the space between said hooks being substantially aligned with said nut element for the reception of a screw threaded shank, whereby said hooks are adapted for subsequent flattening between a surface of a supporting panel and a supported panel when said nut element supporting panel and supported panel are drawn together by screw action.

References Cited by the Examiner

UNITED STATES PATENTS

| | | | |
|---|---|---|---|
| 2,376,167 | 5/1945 | Mitchell | 151—41.75 |
| 2,555,090 | 5/1951 | Kiesel | 151—41.75 |
| 2,567,902 | 9/1951 | Bedford | 151—41.75 |
| 2,746,111 | 5/1956 | Chvosta | 151—41.75 |
| 3,008,552 | 11/1961 | Cushman et al. | 29—526 |
| 3,035,624 | 5/1962 | Jaworski | 151—41.75 |
| 3,175,795 | 3/1965 | Adams | 151—41.74 |
| 3,189,076 | 6/1965 | Adams | 151—41.75 |
| 3,192,823 | 7/1965 | Munse | 85—80 |
| 3,217,585 | 11/1965 | Munse | 85—80 |

FOREIGN PATENTS 613,974  12/1948  Great Britain.

CARL W. TOMLIN, *Primary Examiner.*

EDWARD C. ALLEN, *Examiner.*

M. PARSONS, *Assistant Examiner.*